Patented July 9, 1940

2,207,613

UNITED STATES PATENT OFFICE 2,207,613

2-METHYL-ALLYL PROPIONATE AND METHOD OF MAKING SAME

Gerald H. Coleman and Garnett V. Moore, Midland, Mich., assignors to The Dow Chemical Company, Midland, Mich., a corporation of Michigan No Drawing. Application September 22, 1939, Serial No. 296,042

8 Claims. (Cl. 260—493)

This invention concerns the new compound, 2-methyl-allyl propionate, and a method of making the same.

In our co-pending application, Serial No. 35,514, filed August 9, 1935, of which this application is a continuation-in-part, we have described the preparation of certain unsaturated esters by reacting chloro-olefines having the general formula:

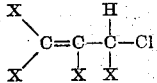

wherein each X represents hydrogen or a hydrocarbon radical, with alkali metal salts of organic carboxylic acids. The present invention concerns the new compound 2-methyl-allyl propionate and its preparation by this same type of reaction. 2-methyl-allyl propionate is useful as an organic solvent, particularly for cellulose acetate and nitro-cellulose compositions, and may also be employed as reactants for the production of other organic products, e. g., dichloro-isobutyl propionate.

In preparing 2-methyl-allyl propionate, a mixture of a 2-methyl-allyl halide (2-methyl-3-halopropene-1), such as 2-methyl-allyl bromide or 2-methyl-allyl chloride, and an alkali metal propionate, e. g., sodium or potassium propionate, is heated to a reaction temperature. The reaction is usually carried out under pressure at temperatures between 125° and 225° C., preferably between 150° and 200° C. when using 2-methyl-allyl chloride as a reactant, so as to obtain rapid reaction and avoid loss of the organic halide reactant through volatilization. However, when using 2-methyl-allyl bromide as the organic halide reactant, it may be carried out at somewhat lower temperatures. The reactants are preferably employed in approximately equimolecular proportions, but they may be used in other proportions if desired. At least some 2-methyl-allyl propionate is formed regardless of the proportions in which the reactants are used.

The reaction proceeds most smoothly and rapidly when carried out in a copper or copper-lined reactor and in the presence of a copper compound, such as cupric acetate, cupric chloride, cuprous oxide, ammonio-copper sulphate, etc., which is soluble in the reaction mixture, but it may be carried out, though less satisfactorily, in a reactor having an inner surface of iron, nickel, or glass, etc., and in the presence or absence of such copper-containing catalyst. However, regardless of the material of the reactor, such catalyst is preferably employed, since it is effective in promoting rapid and complete reaction. The soluble copper compound employed as a catalyst may be added as such to the reaction mixture, but when the reaction is carried out in a copper-lined reactor, sufficient copper usually dissolves to form such catalyst in situ.

To promote such dissolving of copper and thereby speed up the desired reaction an auxiliary agent capable of attacking and dissolving copper may advantageously be added to the reaction mixture. Among the various auxiliary agents which may be added for such purpose are ammonia; ammonium and amine salts such as ammonium chloride, ammonium acetate, diethylamine hydrochloride, cyclohexylamine hydrochloride, etc.; organic nitrogen bases such as methyl amine, diethyl amine, aniline, toluidine, pyridine, quinoline, dicyclohexyl amine, etc.; and acids such as acetic, oxalic, hydrochloric, and sulphuric acids. A mere trace of a copper-containing catalyst is usually sufficient to promote fairly rapid reaction, but a larger proportion may be employed. When the catalyst is to be formed in situ by addition of an agent capable of dissolving copper, it is desirable, of course, to employ only a small proportion of such agent, e. g., 0.1 mole per mole of 2-methyl-allyl halide, so as to avoid excessive attack on the copper reactor. The reaction is usually complete after from 1 to 6 hours of heating under the preferred conditions just stated.

The reactor is then cooled and the charge removed. The alkali metal halide formed by the reaction is separated from the reacted mixture, e. g., by filtration or washing with water, after which the organic mixture may be distilled to purify the 2-methyl-allyl propionate product.

The 2-methyl-allyl halide reactant employed in the above-described process need not be the pure compound but may be a mixture thereof with alkyl halides, e. g., it may be the mixture of 2-methyl-allyl chloride, isobutyl chloride and/or tertiary-butyl chloride obtained by the chlorination of iso-butane. When this mixture is employed in the reaction, the 2-methyl-allyl chloride reacts with the alkali metal propionate to form the desired 2-methyl-allyl propionate; the isobutyl chloride remains unreacted; and the tertiary-butyl chloride is largely decomposed to form isobutylene. The products are readily separated from one another by distillation of the reacted mixture.

The following examples illustrate certain ways in which the principle of the invention has been employed but are not to be construed as limiting the invention:

Example 1

A mixture of 572 grams of crude isobutyl chloride, containing 16 per cent by weight of 2-methyl-allyl chloride, 106 grams of sodium propionate, and 1.4 grams of cuprous oxide was heated in a rotating steel bomb at 175° C. for 3 hours. The bomb was then cooled, discharged, and the reacted mixture was washed free of inorganic chlorides with water. It was then fractionally distilled, whereby there were obtained 419 grams of purified isobutyl chloride, containing less than 1 per cent of 2-methyl-allyl chloride, and 90 grams of 2-methyl-allyl propionate. The latter is a colorless liquid compound having a boiling point of approximately 140°–142° C. at atmospheric pressure, a specific gravity of 0.910 at 20° C. with respect to water at 4° C., and the index of refraction $$n_D^{20} = 1.419$$

Example 2

In a series of additional experiments, isobutyl chloride containing approximately 16 per cent by weight of 2-methyl-allyl chloride was rendered relatively pure by heating the same at 175° C. with sodium propionate under each of the following conditions: (1) in a glass-lined bomb without a catalyst, (2) in a glass-lined bomb and in the presence of cuprous oxide as catalyst, (3) in a nickel bomb without a catalyst, and (4) in a nickel bomb using cuprous oxide as catalyst. The reaction proceeded smoothly but slowly in the absence of a copper-containing catalyst, that in glass being only about 16.5 per cent complete after 3 hours of heating and that in nickel being 54 per cent complete after the same period of heating. Each reaction carried out in the presence of cuprous oxide was more than 85 per cent complete after 3 hours of heating. 2-methyl-allyl propionate was produced in each of the experiments.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. The method which comprises reacting a 2-methyl-allyl halide with an alkali metal propionate to form 2-methyl-allyl propionate.

2. The method which comprises reacting 2-methyl-allyl chloride with an alkali metal propionate to form 2-methyl-allyl propionate.

3. The method which comprises reacting a 2-methyl-allyl halide with an alkali metal propionate in the presence of a soluble copper compound.

4. The method which comprises heating 2-methyl-allyl chloride and at least its molecular equivalent of an alkali metal propionate under pressure and in the presence of a soluble copper compound to a reaction temperature between about 125° and about 225° C.

5. The method which comprises selectively reacting an alkali metal propionate with 2-methyl-allyl chloride in the presence of isobutyl chloride.

6. The method which comprises adding to a mixture of 2-methyl-allyl chloride and isobutyl chloride at least one mole of an alkali metal propionate per mole of the 2-methyl-allyl chloride, and heating the mixture under pressure in the presence of a soluble copper compound to a reaction temperature between about 125° and about 225° C.

7. The method which comprises adding to a mixture of 2-methyl-allyl chloride and isobutyl chloride, at least one mole of sodium propionate per mole of the 2-methyl-allyl chloride, heating the mixture under pressure in contact with copper surfaces to a reaction temperature between about 150° and about 200° C., and thereafter distilling the mixture to separate the resultant 2-methyl-allyl propionate and purified isobutyl chloride.

8. 2-methyl-allyl propionate.

GERALD H. COLEMAN.
GARNETT V. MOORE.